G. W. McCLINTOCK.
UNIVERSAL COUPLING.
APPLICATION FILED AUG. 3, 1908.

915,690.

Patented Mar. 16, 1909.

WITNESSES:
Clinton D. Murray
Ethel L. Lister

INVENTOR
George W. McClintock,
BY Thomas L. Ryan
ATTORNEY

UNITED STATES PATENT OFFICE.

GEORGE W. McCLINTOCK, OF MUNCIE, INDIANA, ASSIGNOR OF ONE-HALF TO WILLIAM J. KILLIAN, OF MUNCIE, INDIANA.

UNIVERSAL COUPLING.

No. 915,690.  Specification of Letters Patent.  Patented March 16, 1909.

Application filed August 3, 1908. Serial No. 446,518.

*To all whom it may concern:*

Be it known that I, GEORGE W. McCLINTOCK, a citizen of the United States, and a resident of the city of Muncie, county of Delaware, and State of Indiana, have invented a new and useful Universal Coupling, of which the following is a specification.

This invention has reference to couplings for the transmission of power from the driving shaft to the driven shaft arranged in alinement with or at an angle to each other, and has for its object to provide a coupling or universal joint of this character which will be reliable and noiseless in operation, and which will be of great strength and durability and of simple and rigid construction.

The objects of my invention are accomplished by the construction, combination and arrangement of parts described in the following specification, pointed out in the appended claims and illustrated in the accompanying drawings, wherein similar characters of reference refer to corresponding parts throughout the several views, in which—

Figure 1:
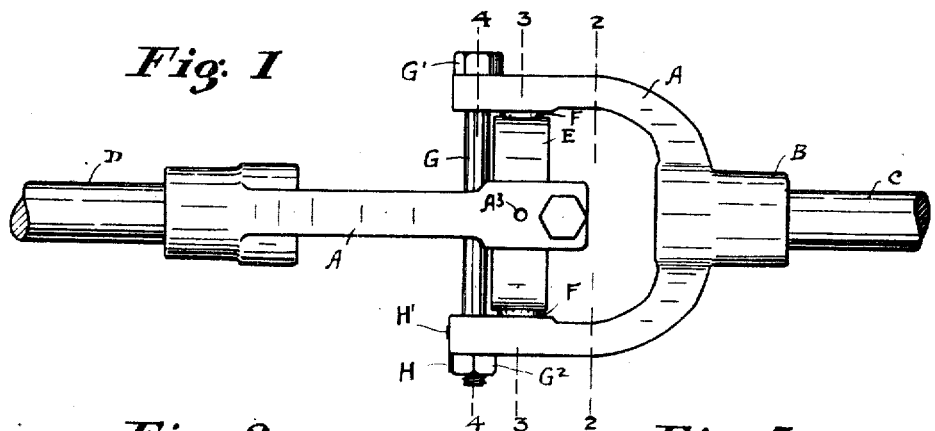
Figure 2:
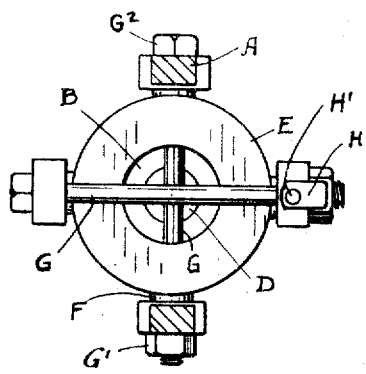
Figure 3:
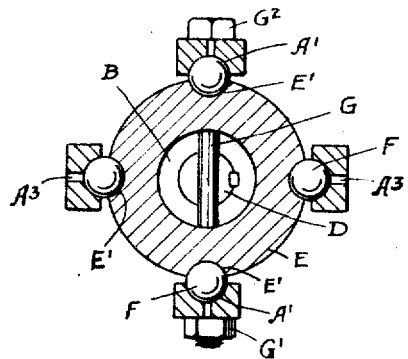
Figure 4:
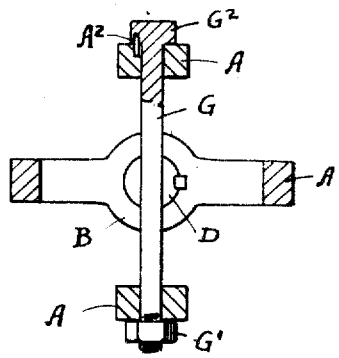

Figure 1 is a view of my improved universal coupling complete. Fig. 2 is a transverse sectional view taken on the line 2—2 Fig. 1; Fig. 3 is a transverse sectional view taken on the line 3—3 Fig. 1; and Fig. 4 is a transverse sectional view taken on the line 4—4 Fig. 1.

The forks A are made of suitable metal having proper resilient quality; each has the base-portion B which is suitably bored and provided with a key-seat for the reception of the shafts which I have designated as C and D. Each of these forks is made of substantial area in cross section so as to withstand such strain as may be imposed thereon. The internal faces of the fork-ends reside the proper distance apart as to permit proper clearance for the oscillatory movement of the ring E. This ring is made of metal of proper quality and formed in its peripheral face equi-distant from each other are the four semi-spherical depressions $E^1$ which will register with similar depressions $A^1$ in the fork-ends. The steel balls F provide such bearing between the ends of the forks and the ring E that friction between the members is reduced to a minimum and a bearing is accomplished that will present no surfaces or recesses wherein sediment can find lodgment.

G designate span-bolts the function of which is to resist any tendency of the fork ends to spread under the imposition thereon of unusually heavy strains. Another advantage afforded by these span-bolts is that the slightest wearing away of the ball joint may be compensated for by simply drawing the fork-ends slightly closer together by manipulating the nut $G^1$. The head $G^2$ of each is provided with a recess on its underside to receive the stud $A^2$ that is secured in the outer face of the fork-ends, whereby rotary movement of the span-bolt is prevented.

A suitable device to lock the nut $G^1$ in position on the span-bolt G is shown in Fig. 2 which consists of the spring clip H countersunk in a shallow channel in the fork-end and sustained by the rivet or screw $H^1$ so that when the nut $G^1$ is set in the desired position the clip will press against the lateral face of the nut and hold it firmly in the set position. It is obvious that any suitable device for locking these nuts may be used.

In the manufacture of my invention the forks are finished to the form substantially as shown, and have the depressions properly machined therein; similar depressions are machined in the peripheral face of the ring E. To assemble the parts the arms of the fork are sprung apart sufficiently to permit the insertion of the balls between the fork-ends and the ring; the balls being in position as indicated, the span-bolts are then tightened and the fork-ends may thus be drawn toward each other so precisely as to form and maintain a true bearing. While it is possible to assemble the parts by hand operative means, it is contemplated that machinery for assembling these parts may be used.

It will be readily understood that proportioned as shown, the sectional area of the respective parts are of such ample proportions in reference to the sectional area of the shafts through which the power is being transmitted, that a coupling of great strength and rigidity is accomplished.

While I have shown the central member in the form of a ring it is obvious that it may be made as well in the form of a solid disk or other form.

Advantages additional to those heretofore stated are that slight if any lubrication is needed for the perfect operation of my invention; by virtue of the perforations $A^3$ through the fork ends and the arrangement of the fork ends and the ring E apart from each other, the application of the lubricant as may be necessary is facilitated and all tendency of the bearings to become gummed or clogged is overcome.

What I claim as my invention and desire to secure by Letters Patent of the United States, is—

1. A coupling of the kind described, comprising a pair of members having oppositely disposed faces, a member disposed between the said member and each of said faces, a ball bearing connection between the said member and each of said faces, a member to sustain the opposite faces of each of said pair of members in adjustable position with reference to each other.

2. A coupling of the kind described, comprising a pair of forked members, a central member, a pivotal connection between said central member and each of the forked members including balls to engage the central member and the ends of the forked members, a device carried by each forked member to sustain the opposite faces of each forked member in adjustable position with reference to each other.

3. A coupling of the kind described comprising a pair of resilient forked members having the fork-ends recessed upon their inner faces, a central member having recesses upon its face to register with the recesses in the fork-ends, balls to join the fork-ends to said central member and to be seated in the recesses therefor, means to draw the fork-ends toward each other and to sustain the same in different adjusted positions, substantially as described.

4. A coupling of the kind described, comprising a pair of resilient forked members having the fork-ends recessed upon their inner faces, a central member having recesses upon its face to register with the recesses in the fork-ends, balls to join the fork-ends to said central member and to be seated in the recesses therefor, a span-bolt between the arms of each forked member to draw the said arms toward each other and to sustain the same in different adjusted positions, substantially as described.

In testimony whereof I sign my name to this specification in the presence of two subscribing witnesses.

GEORGE W. McCLINTOCK.

Witnesses:
THOMAS L. RYAN,
ETHEL L. LISTER.